(12) United States Patent
Onsjö et al.

(10) Patent No.: US 8,972,331 B2
(45) Date of Patent: Mar. 3, 2015

(54) DECIDING AN OPTIMAL ACTION IN CONSIDERATION OF RISK

(75) Inventors: Mikael F. Onsjö, Kanagawa (JP); Takayuki Osogami, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 13/371,513

(22) Filed: Feb. 13, 2012

(65) Prior Publication Data

US 2012/0209801 A1     Aug. 16, 2012

(30) Foreign Application Priority Data

Feb. 15, 2011     (JP) ................... 2011-029660

(51) Int. Cl.
*G06N 5/02* (2006.01)
*G06Q 10/00* (2012.01)
*G06N 7/00* (2006.01)

(52) U.S. Cl.
CPC ...................... *G06N 7/005* (2013.01)
USPC .......................................... 706/52; 705/7.28

(58) Field of Classification Search
None
See application file for complete search history.

(56) References Cited

U.S. PATENT DOCUMENTS

2011/0246386 A9 *    10/2011    Keenan et al. .............. 705/36 R

FOREIGN PATENT DOCUMENTS

| JP | 2002-063345 A | 2/2002 |
|---|---|---|
| JP | 2002-092311 A | 3/2002 |
| JP | 2002-230280 | 8/2002 |
| JP | 2002-334207 A | 11/2002 |
| JP | 2003-108759 A | 4/2003 |
| JP | 2006-309571 A | 11/2006 |
| JP | 2009-134337 A | 6/2009 |
| JP | 2009-266184 A | 11/2009 |
| JP | 2010-211588 | 9/2010 |
| JP | 4400837 | 9/2010 |

OTHER PUBLICATIONS

Artzner, P. et al. "Coherent measures of risk." Mathematical finance vol. 9 No. 3 (1999) pp. 203-228. [retreived from onlinelibrary.wiley.com].*
Boda, K. et al. "Time consistent dynamic risk measures." Mathematical Methods of Operations Research vol. 63 No. 1 (2006) pp. 169-186. [retrieved from link.springer.com].*

(Continued)

*Primary Examiner* — Kakali Chaki
*Assistant Examiner* — Eric Nilsson
(74) *Attorney, Agent, or Firm* — Scully, Scott, Murphy & Presser, P.C.; Jeff Tang, Esq.

(57) ABSTRACT

A method and system for deciding an optimal action in consideration of risk. The method includes the steps of: generating sequentially, by way of a Markov decision process based on a Monte Carlo method, a series of data having states on a memory of a computer; computing a risk measure of a present data by tracking generated data from opposite order to generation order, where the risk measure is calculated from a value at risk or an exceedance probability that is derived from risk measures of a plurality of states transitionable from a state of the present data; and executing the step of computing the risk measure while tracking back to starting data, where at least one of the steps is carried out using a computer device.

14 Claims, 9 Drawing Sheets

(56) References Cited

OTHER PUBLICATIONS

Hardy, M. et al. "The iterated CTE: a dynamic risk measure." North American Actuarial Journal vol. 8 No. 4 (2004): pp. 62-75. [retrieved from tandfonline.com].*

Chong, E. et al. "Monte-Carlo-based partially observable Markov decision process approximations for adaptive sensing." Discrete Event Systems, 2008. WODES 2008. 9th International Workshop on. IEEE, 2008.*

M. R. Hardy and J. L. Wirch, "The iterated CTE: A dynamic risk measure". The North American Actuarial Journal, 62-75, 2004.

* cited by examiner

| STATE | REACHING PROBABILITY FROM s |
|---|---|
| $s_1$ | $p_1$ |
| $s_2$ | $p_2$ |
| ⋮ | ⋮ |
| $s_n$ | $p_n$ |

| POSTDECISION STATE | Value | COUNTER |
|---|---|---|
| $s'_1 = (s, a_1)$ | $v_1$ | $c_1$ |
| $s'_2 = (s, a_2)$ | $v_2$ | $c_2$ |
| ⋮ | ⋮ | ⋮ |
| $s'_n = (s, a_n)$ | $v_n$ | $c_n$ |

DECIDING AN OPTIMAL ACTION IN CONSIDERATION OF RISK

CROSS-REFERENCE TO RELATED APPLICATION

This application claims priority under 35 U.S.C. §119 from Japanese Patent Application No. 2011-029660 filed Feb. 15, 2011, the entire contents of which are incorporated herein by reference.

BACKGROUND OF THE INVENTION

1. Field of the Invention

The present invention relates to a technique of deciding an optimal action in consideration of risk. More specifically, the present invention relates to a technique of deciding an action using Markov decision process (MDP).

2. Description of Related Art

A simulation system and simulation method of integrally evaluating interest risk and credit risk of a portfolio are described in Japanese Unexamined Patent Publication No. 2002-230280. The technique provides that: (1) a large number of scenarios from a present time to a risk horizon are generated based on a default-free interest process model and a default process model; (2) a price of a portfolio and a price of an individual asset in the risk horizon are computed for each of the generated scenarios; and (3) a future price distribution of the portfolio and/or a future price distribution of the individual asset are determined based on the computed prices. As a result, the technique integrally evaluates interest risk and credit risk of the portfolio.

Research is also conducted on a risk computation technique that uses a Markov process. The Markov process has a Markov property, where its future state transition depends only on its present state and independently of its past state. Research is further conducted on an action decision technique that uses a Markov decision process, which is an extension of the Markov process. For example, for a target capable of undergoing state transitions, a Markov decision process problem is a problem to find a rule for deciding an action to be executed in each state in order to maximize an expected cumulative reward obtained from the target.

To provide a credit portfolio control method used for selecting an optimal policy in credit control to enable situations of external factors such as an economic environment and a set credit line to be reflected on a future credit rating transition probability, Japanese Patent No. 4400837 discloses a technique of creating a graph in which transitions of combinations of each state of an existing credit and each state of an external factor from the first to T-th years are represented. The technique provides: (1) for the first year, a node including an existing credit's initial state and the external factor's initial state and; and (2) for the second to T-th years, nodes indicating patterns of combinations of each state of the existing credit and each state of the external factor. The aforementioned technique corresponds to finding an optimal policy that, by way of solving a Markov decision process problem of T years by dynamic programming (DP), maximizes an expected total gain for T years while tracking back from a terminal T-th year node.

In addition, an iterated risk measure is recently receiving attention as a risk measure based on which a financial institution determines its capital. A (conditional) value at risk is also called a CTE (conditional tail expectation), but has no time consistency. However, the iterated risk measure has time consistency. This is described in M. R. Hardy and J. L. Wirch, "The iterated CTE: A dynamic risk measure", The North American Actuarial Journal, 62-75, 2004.

However, a backward-computed iterated CTE (ICTE) is considered to be difficult to implement, because ICTE requires a large computation load. Furthermore, a typical Monte Carlo method cannot handle ICTE.

The iterated risk measure can represent risk preference that is rational but cannot be represented by expected utility, discounted expected utility, or the like. Accordingly, Japanese Patent Application No. 2010-211588 discloses a technique of optimizing a Markov decision process so as to minimize the iterated risk measure using dynamic programming.

However, the technique described in the specification of Japanese Patent Application No. 2010-211588 requires an extremely long computation time when the number of possible states or actions increases. Thus, the technique can actually solve only limited problems, and as a result the technique is constrained.

SUMMARY OF THE INVENTION

Accordingly, one aspect of the present invention provides a method for computing an iterated risk measure, the method including the steps of: generating sequentially, by way of a Markov decision process based on a Monte Carlo method, a series of data having states on a memory of a computer; computing a risk measure of a present data by tracking generated data from opposite order to generation order, where the risk measure is calculated from a value at risk or an exceedance probability that is derived from risk measures of a plurality of states transitionable from a state of the present data; and executing the step of computing the risk measure while tracking back to starting data, where at least one of the steps is carried out using a computer device.

Another aspect of the present invention provides a method for computing an action that minimizes an iterated risk measure, the method including the steps of: generating, during postdecision, data including combinations of a predetermined state and a possible action on a memory of the computer; selecting a state-action combination data from generated data of the combinations of the state and the action, based on a value associated with each of the combinations; generating, during predecision, a state from selected state-action combination data, by way of a Markov decision process based on a Monte Carlo method; generating a state data sequence by iterating the step of generating a state and the step of generating data including combinations; computing, based on risk measures of a plurality of states transitionable from a present predecision state, a risk measure of an immediately preceding postdecision state by tracking generated states in opposite order to order of the generation, where the risk measure is calculated from a value at risk or an exceedance probability; and setting a value of a state having a minimum value in a present postdecision state to an immediately preceding predecision state, by tracking the generated states in the opposite order to the order of the generation, where at least one of the steps is carried out using a computer device.

Another aspect of the present invention provides a system for computing an iterated risk measure, the system including: a generating module for generating sequentially, by way of a Markov decision process based on a Monte Carlo method, a series of data having states on a memory of a computer; a risk measure module for computing a risk measure of a present object by tracking generated data from opposite order to generation order, where the risk measure is calculated from a value at risk or an exceedance probability that is derived from risk measures of a plurality of states transitionable from a state of the present object; and an executing module for executing the risk measure module while tracking back to starting object.

Another aspect of the present invention provides a system for computing an action that minimizes an iterated risk measure, the system including: a postdecision module for generating, during postdecision, data including combinations of a predetermined state and a possible action on a memory of the computer; a selecting module for selecting a state-action combination data from generated data of the combinations of the state and the action, based on a value associated with each of the combinations; a predecision module for generating, during predecision, a state from selected state-action combination data, by way of a Markov decision process based on a Monte Carlo method; a state data sequence module for generating a state data sequence by iterating the step of generating a state and the step of generating data including combinations; a risk measure module for computing, based on risk measures of a plurality of states transitionable from a present predecision state, a risk measure of an immediately preceding postdecision state by tracking generated states in opposite order to order of the generation, where the risk measure is calculated from a value at risk or an exceedance probability; and a value module for setting a value of a state having a minimum value in a present postdecision state to an immediately preceding predecision state, by tracking the generated states in the opposite order to the order of the generation.

According to the present invention, it becomes possible to provide a technique of approximately obtaining an iterated risk measure at high speed using a probabilistic method such as a Monte Carlo method, where a typical iterated risk measure normally requires considerable time when precisely computed.

It is also possible to provide a technique of obtaining an action sequence that minimizes an iterated risk measure at high speed, using the above-mentioned technique of approximately obtaining an iterated risk measure at high speed.

DETAILED DESCRIPTION OF THE PREFERRED EMBODIMENTS

Figure 1:
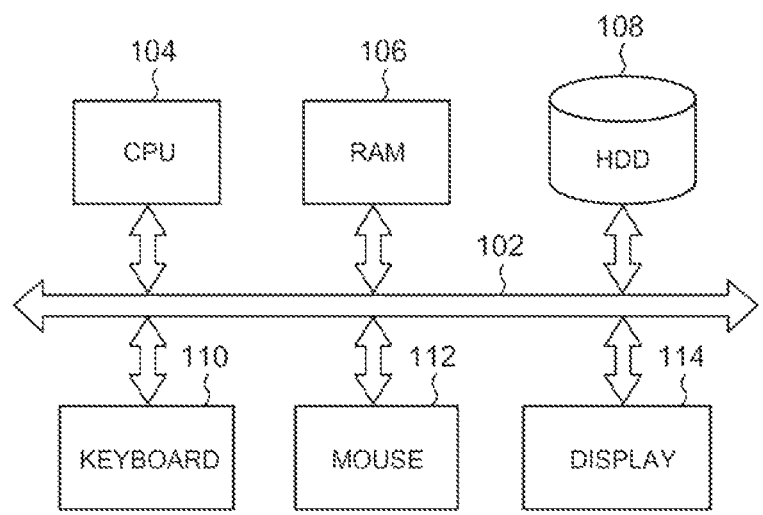
FIG. 1 is a block diagram showing a hardware structure as an example for implementing the present invention.

The following describes an embodiment of the present invention based on drawings. The same reference numerals designate the same elements throughout the drawings, unless otherwise stated. Note that the following merely describes one embodiment of the present invention, and the scope of the present invention is not limited to this embodiment.

It is an object of the present invention to provide a technique of computing an iterated risk measure at high speed using a Monte Carlo method, in a Markov process.

It is another object of the present invention to provide a technique of approximately deciding an action that minimizes an iterated risk measure by applying the above-mentioned technique of computing an iterated risk measure at high speed, in a Markov decision process of such a size that cannot be precisely optimized.

In a first aspect of the present invention, a state sequence (S1, S2, ..., Sn) is generated by sequential sampling based on a Markov process, by processing of a computer. A (iterated risk measure provisional) value (V(Sn), ..., V(S2), V(S1)) of each state is then updated in opposite order (Sn, ..., S2, S1) to the generation order.

A value V(Si) of each state Si is updated according to a risk measure (especially computed using a value at risk or an exceedance probability or partially using them) of a random variable defined from a transition probability p(Si+1(j)|Si) to a state (Si+1(1), Si+1(2), ..., Si+1(m)) reachable from the state by one transition and a value V(Si+1(j)) of the transition destination. Iterating this process of a predetermined duration yields an iterated risk measure approximate value. Hereafter, the iterated risk measure provisional value is also simply referred to as a "value".

In a second aspect of the present invention, a technique of approximately deciding an action that minimizes an iterated risk measure in a specific state through the use of the above-mentioned technique of approximately computing a risk measure is provided. In this technique, states are generated so that a predecision state and a postdecision state appear alternately in the above-mentioned technique of the first aspect.

A (iterated risk measure provisional) value of a postdecision state is computed using a value of a next reachable predecision state, as in the above-mentioned technique of the first aspect. A (iterated risk measure provisional) value of a predecision state is updated using a minimum iterated risk measure provisional value of a next reachable postdecision state. As a result of iteration, an action sequence that minimizes an iterated risk measure is selected.

FIG. 1 is a block diagram of computer hardware for realizing a system structure and process according to an embodiment of the present invention. In FIG. 1, a CPU 104, a main memory (RAM) 106, a hard disk drive (HDD) 108, a keyboard 110, a mouse 112, and a display 114 are connected to a system path 102. The CPU 104 is preferably based on a 32-bit or 64-bit architecture. For example, PENTIUM™ 4, CORE™ 2 DUO, or XEON™ by INTEL Corporation, ATHLON™ by AMD, or the like can be used for the CPU 104. The main memory 106 preferably has a capacity of 4 GB or more. The hard disk drive 108 desirably has a capacity of, for example, 500 GB or more, to allow a large amount of data to be stored.

The hard disk drive 108 stores an operating system beforehand, though not shown. The operating system can be an arbitrary operating system compatible with the CPU 104, such as LINUX™, WINDOWS XP™ or WINDOWS™ 7 by MICROSOFT Corporation, or MAC OS™ by APPLE Inc.

The hard disk drive 108 also stores data and parameters for probability computation of a Markov decision process, processing routines for the process according to the present invention, and so on. These parameters and processing routines will be described in detail later, with reference to FIG. 2.

The keyboard 110 and the mouse 112 are used to activate the operating system or a program (not shown) which is loaded from the hard disk drive 108 into the main memory 106 and displayed on the display 114, or enter characters.

The display 114 is preferably a liquid crystal display, and can have, for example, an arbitrary resolution such as XGA (1024×768 in resolution) or UXGA (1600×1200 in resolution). The display 114 is used to display an operation window for starting the process according to the present invention, a computation result of a selected action, risk, and the like, though not shown.

Figure 2:
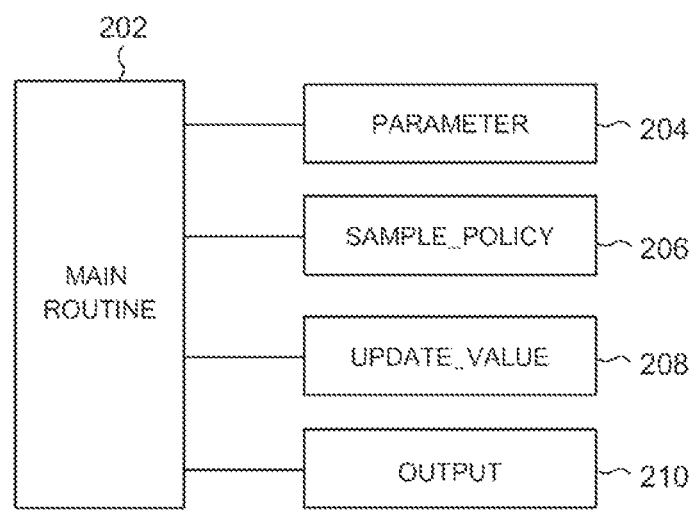
FIG. 2 is a functional block diagram of a logical structure for a process of computing an iterated risk measure according to an embodiment of the present invention.

The following describes processing routines for executing especially a process of approximately computing an iterated risk measure according to the present invention, with reference to a functional block diagram in FIG. 2. These processing routines are generated in an existing programming language such as C, C++, or JAVA® beforehand, held in the hard disk drive 108 in an executable form, and loaded into the main memory 106 and executed according to the operating system.

In this embodiment, a process of selecting a stock in which a user is to invest in each term with predetermined money in possession is described as the process according to the present invention, though the present invention is not limited to such. The following scenario is assumed. A stock in which the user is to invest in each term is selected, starting from predetermined money in possession. A state is represented by a combination of (money in possession, stock in which the user invests, time). There are action candidates as many as stock types. In each term, there are action candidates as many as stock types, and which stock the user is to invest in is decided. A return as a result of taking an action in each state is determined by a return for a period of a corresponding stock.

A main routine 202 is a program for an overall operation according to the present invention, and has a function of displaying an operation window on the display 114, receiving a user operation and starting a process, and the like, though not shown.

A parameter 204 includes parameters and data for computing probability of a Markov decision process indicating performance of various stocks, and the like.

A SAMPLE_POLICY routine 206 is a routine for performing a process of generating a state with a predetermined probability by a generated random number, according to a Monte Carlo method.

An UPDATE_VALUE routine 208 is a routine for computing a risk measure by referencing to a set of directly transitionable states.

An output routine 210 is a routine for outputting a risk value as a computation result. The computation result is displayed on the display 114 according to need.

Figure 3:
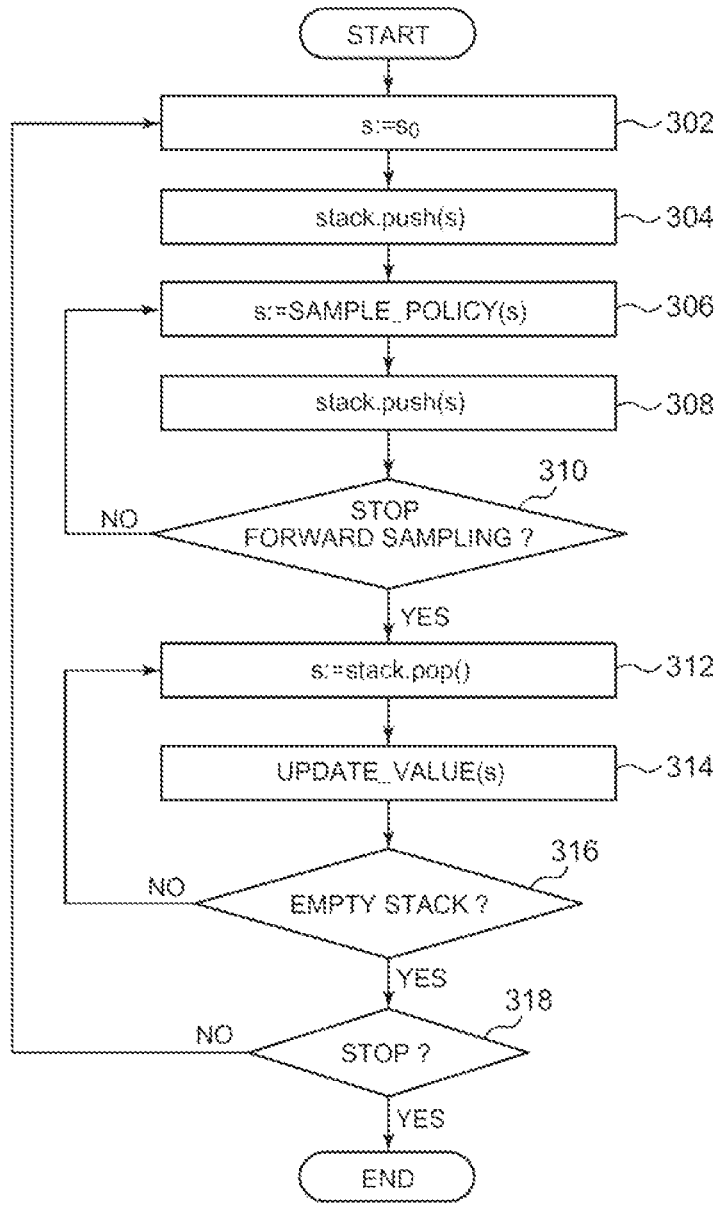
FIG. 3 is a flowchart of the process of computing an iterated risk measure according to an embodiment of the present invention.

The following describes the process of approximately computing an iterated risk measure according to the present invention, with reference to a flowchart in FIG. 3. For example, this process is started by an operator operating a menu of a window screen displayed on the display 114 using the keyboard 110 or the mouse 112.

Figure 8:
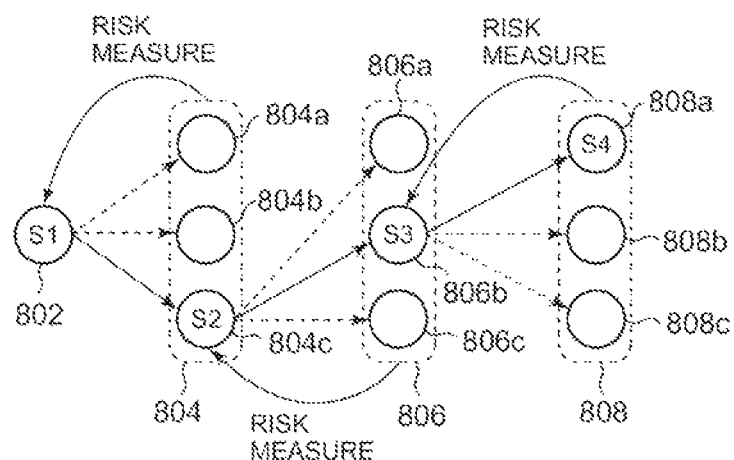
FIG. 8 is a diagram schematically showing the process of computing an iterated risk measure.

In this embodiment, it is assumed that a series of data objects for storing states are already loaded into the main memory 106 prior to the process described below. The data objects are, for example, instances of a class in JAVA® or C++. FIG. 8 schematically shows such data objects. A series of data objects 802, 804, 806, and 808 is shown in FIG. 8.

In step 302, the main routine 202 sets an initial value of a variable s indicating a state, from the parameter 204. The variable s is set to an attribute value of the data object 802 which is the first data object in FIG. 8. For example, the state is represented by a combination of (money in possession, stock in which the user invests, time).

In step 304, the main routine 202 pushes the state s onto a stack. Such pushing the state s onto the stack is performed for later popping and backtracking of the state.

Next, in step 306, the main routine 202 calls the SAMPLE_POLICY routine 206 by SAMPLE_POLICY(s) using s as an argument.

Figures 4, 5:
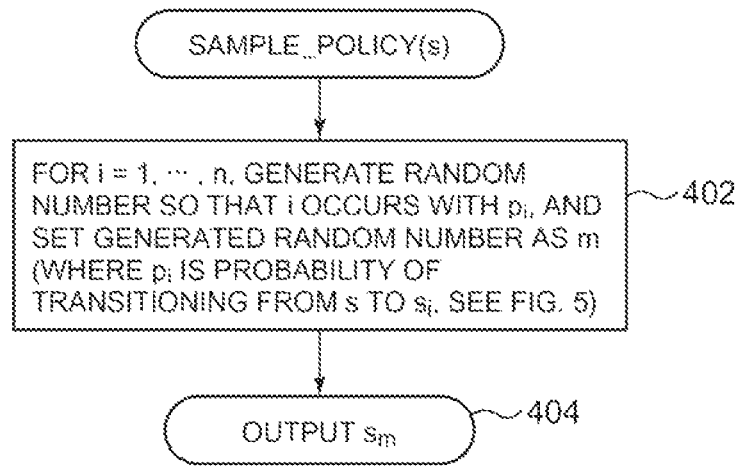
FIG. 4 is a flowchart of a process of a SAMPLE_POLICY routine in the process of computing an iterated risk measure.
FIG. 5 is a diagram showing correspondence between states and reaching probabilities referenced to in the SAMPLE_POLICY routine.

FIG. 4 shows a detailed process of the SAMPLE_POLICY routine 206. In FIG. 4, the SAMPLE_POLICY routine 206 generates, for i=1, . . . , n, a random number so that i occurs with a probability $p_i$, in step 402. The generated random number is denoted by m ($1 \leq m \leq n$). The probability $p_i$ mentioned here is a probability of transiting from the state s to a state $s_i$, in a Markov process context.

FIG. 5 shows a transition probability of each state $s_i$ from s. Such correspondence information is prepared beforehand for each different s, in the parameter 204.

The SAMPLE_POLICY routine 206 outputs a state $s_m$ corresponding to the random number m in step 404.

Returning to step 306 in FIG. 3, such a returned value $s_m$ is assigned to s. This corresponds to a situation where a transition is made to a state S2 of the data object 804 in FIG. 8.

In step 308, the main routine 202 pushes the state s onto the stack. In step 310, the main routine 202 determines whether or not to stop forward sampling. A criterion for stopping forward sampling is, for example, whether or not states are generated for a predetermined number of stages. In the example in FIG. 8, the state 802 is the first stage, the state 804 is the second stage, the state 806 is the third stage, and the state 808 is the fourth stage. Alternatively, the criterion for stopping forward sampling can be whether or not a predetermined time elapses from the start of the process.

In the case where the main routine 202 determines that the criterion for stopping forward sampling is not met, the main routine 202 returns to step 306 and calls the SAMPLE_POLICY routine 206.

On the other hand, in the case where the main routine 202 determines that the criterion for stopping forward sampling is met in step 310, the main routine 202 goes to step 312, and pops the state s from the stack.

Next, in step 314, the main routine 202 calls the UPDATE_VALUE routine 208 by UPDATE_VALUE(s).

Figures 6, 7:
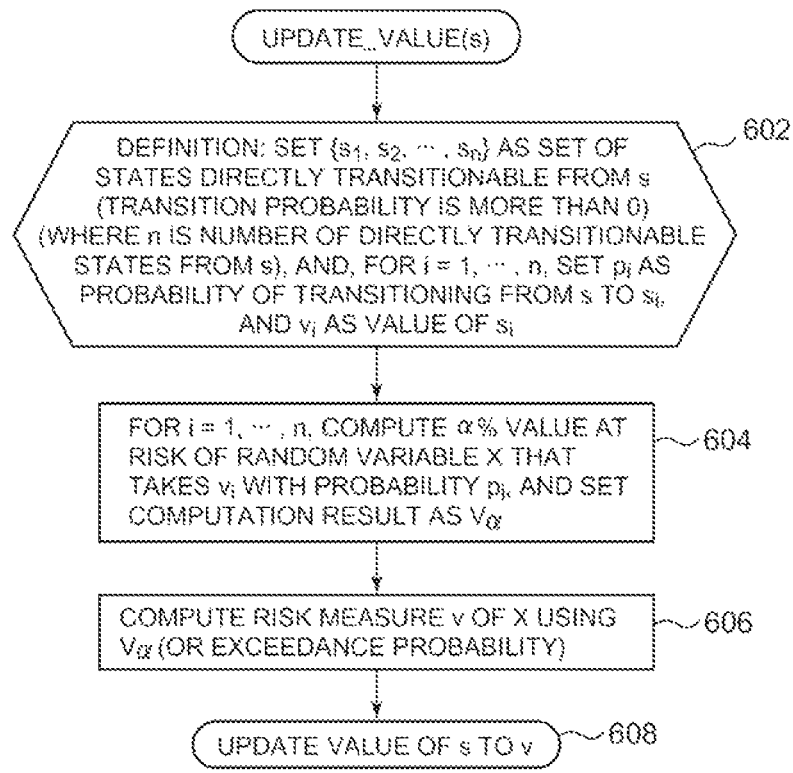
FIG. 6 is a flowchart of a process of an UPDATE_VALUE routine in the process of computing an iterated risk measure.
FIG. 7 is a diagram showing correspondence between states, values, and reaching probabilities referenced to in the UPDATE_VALUE routine.

FIG. 6 shows a detailed process of the UPDATE_VALUE routine 208. Step 602 is a definition block. In step 602, the UPDATE_VALUE routine 208 sets $\{s_1, s_2, \ldots, s_n\}$ as a set of states directly transitionable from s (i.e. having a transition probability more than 0), where n is the number of directly transitionable states from s. In the example in FIG. 8, states 806a, 806b, and 806c are directly transitionable states from the state S2 designated by reference numeral 804c. The UPDATE_VALUE routine 208 also sets, for i=1, ..., n, $p_i$ as a probability of transitioning from s to $s_i$, and $v_i$ as a value (iterated risk measure provisional value) of $s_i$. FIG. 7 shows this correspondence. In FIG. 7, the fields of the state and the reaching probability from s are based on values stored in the parameter 204 beforehand, but the field of the value can initially store 0. This being the case, values are sequentially stored as a result of computation. Alternatively, the value can be initially set as the money in possession in the state. The present invention can be realized with other initial value settings.

In step 604, the UPDATE_VALUE routine 208 computes, for i=1, ..., n, a α% value at risk of a random variable X that takes the value $v_i$ with the probability $p_i$, according to the following expression. The computation result is denoted by $V_\alpha$.

$$VaR_{\alpha\%}[X] = \inf_{x \in R} \left\{ \sum_{i: v_i > x} p_i \leq 1 - \frac{\alpha}{100} \right\} \quad \text{[Math. 1]}$$

An exceedance probability can be computed instead of $V_\alpha$, according to the following expression.

$$Pr(X > x) = \sum_{i: v_i > x} p_i \quad \text{[Math. 2]}$$

In step 606, the UPDATE_VALUE routine 208 computes a risk measure v of X, using $V_\alpha$ or the exceedance probability. For example, this computation is performed as v=E[X|X>$V_\alpha$]. As an alternative, the risk measure v can be computed by the following expression partially using the exceedance probability.

$$p_n[Y] = E[Y] - c(Pr(Y \leq 0) - \alpha)I\{Pr(Y \leq 0) \geq \alpha\} \quad \text{[Math. 3]}$$

In this expression, I{ } is a function that returns 1 when the expression in { } is true, and 0 when the expression in { } is false.

In step 608, the UPDATE_VALUE routine 208 stores the computed v as a value corresponding to the state s. In the example in FIG. 8, the risk measure v computed based on the states 806a, 806b, and 806c is stored in association with the state S2.

Returning to the process of the flowchart in FIG. 3, after step 314 of calling UPDATE_VALUE(s), the main routine 202 determines whether or not the stack is empty in step 316. In the case where the stack is not empty, the main routine 202 returns to step 312.

In the case where the main routine 202 determines that the stack is empty in step 316, the main routine 202 determines whether or not a stopping condition is met in step 318. The stopping condition mentioned here is any of whether or not a predetermined time elapses from the start of the process shown in the flowchart in FIG. 3, whether or not a loop of steps 302 to 318 is performed a predetermined number of times, or whether or not a risk measure computed value at the starting point designated by S1 in FIG. 8 eventually has only a change of a threshold or below from a value computed in the immediately preceding loop of steps 302 to 318, though the present invention is not limited to such.

In the case where the main routine 202 determines that the stopping condition is not met in step 318, the main routine 202 returns to step 302, to resume computation from the first state S1 in FIG. 8. At this time, the previously computed risk measure values (the values in the value field in FIG. 7) are maintained, so that the intermediate risk measure values which were initially mostly 0 are gradually changed to non-zero values as the loop of steps 302 to 318 is repeated.

In the case where the main routine 202 determines that the stopping condition is met in step 318, the process ends, and the output routine 210 outputs a risk measure value corresponding to the first state S1 in FIG. 8.

Figure 9:
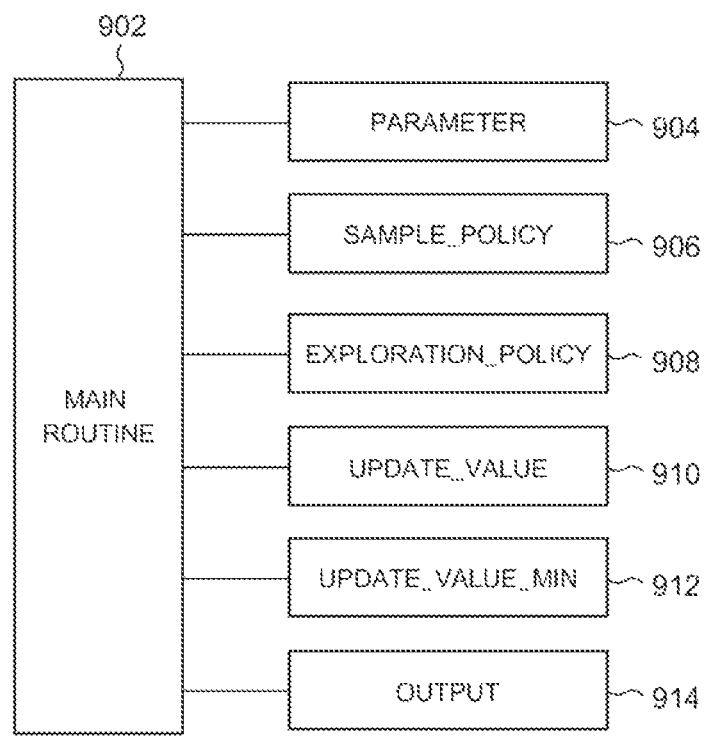
FIG. 9 is a functional block diagram of a logical structure for a process of deciding an action that minimizes an iterated risk measure according to the present invention.

The following describes processing routines for executing a process of approximately deciding an action that minimizes an iterated risk measure in a specific state according to the present invention, with reference to a functional block diagram in FIG. 9. These processing routines are also generated in an existing programming language such as C, C++, or JAVA® beforehand, held in the hard disk drive 108 in an executable form, and loaded into the main memory 106 and executed according to the operating system.

The process of approximately deciding an action that minimizes an iterated risk measure uses the routine for approximately computing an iterated risk measure shown in FIG. 2, and so there are some common processing routines. However, the processing routines in FIG. 9 are given different reference numerals from those in FIG. 2.

In this embodiment, too, a process of selecting a stock in which the user is to invest in each term with predetermined money in possession is described as the process according to the present invention. The following scenario is assumed. A stock in which the user is to invest in each term is selected, starting from predetermined money in possession. A state is represented by a combination of (money in possession, stock in which the user invests, time). There are action candidates as many as stock types. In each term, there are action candidates as many as stock types, and which stock the user is to invest in is decided. A return as a result of taking an action in each state is determined by a return for a period of a corresponding stock.

A main routine 902 is a program for an overall operation according to the present invention, and has a function of displaying an operation window on the display 114, receiving a user operation and starting a process, and the like, though not shown.

A parameter 904 includes parameters and data for computing probability of a Markov decision process indicating performance of various stocks, and the like.

A SAMPLE_POLICY routine 906 is a routine for performing a process of generating a state with a predetermined probability by a generated random number, according to a Monte Carlo method. The SAMPLE_POLICY routine 906 can be the same as the SAMPLE_POLICY routine 206 in FIG. 2.

An EXPLORATION_POLICY routine 908 is a routine for selecting a postdecision state.

An UPDATE_VALUE routine 910 is a routine for computing a risk measure by referencing to a set of directly transitionable states. The UPDATE_VALUE routine 910 can be the same as the UPDATE_VALUE routine 208 in FIG. 2.

An UPDATE_VALUE_MIN routine 912 is a routine for returning a minimum value in the set of directly transitionable states.

An output routine 914 is a routine for outputting an action sequence as a computation result. The computation result is displayed on the display 114 according to need.

Figure 10:
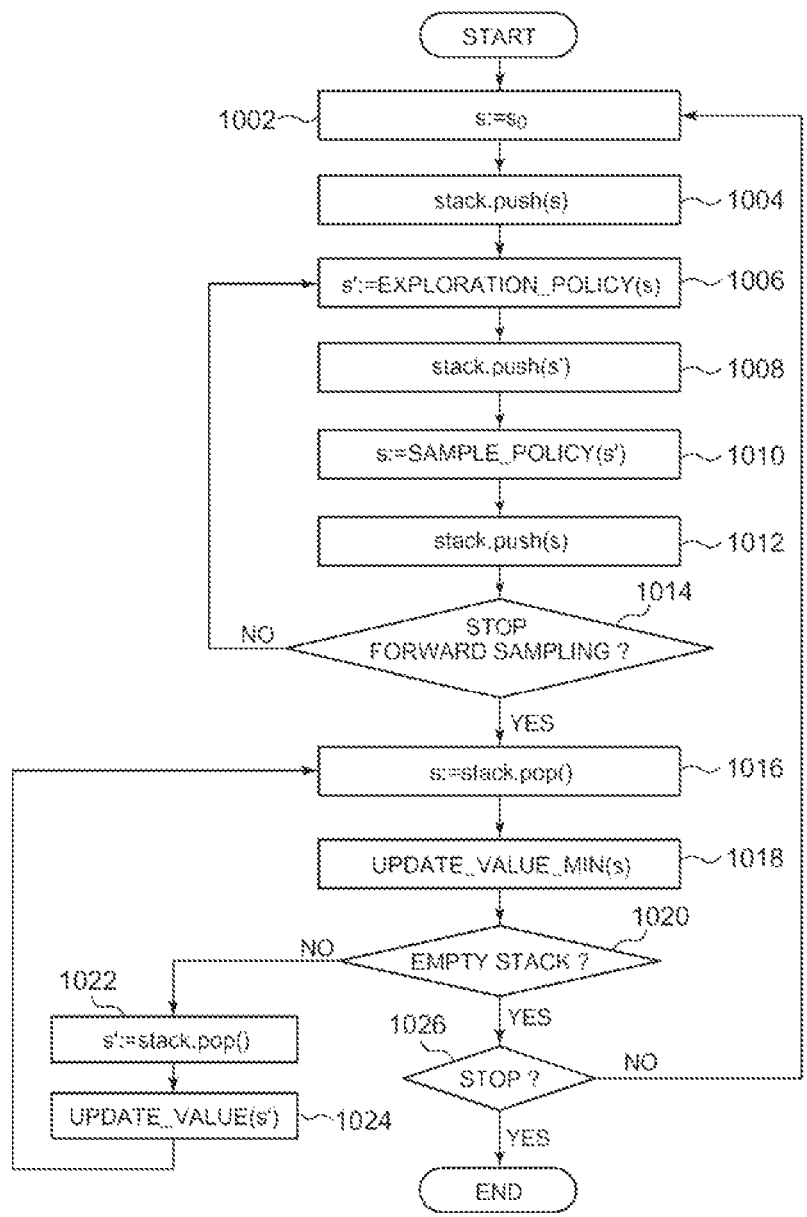
FIG. 10 is a flowchart of the process of deciding an action that minimizes an iterated risk measure according to the present invention.

The following describes the process of approximately deciding an action that minimizes an iterated risk measure according to the present invention, with reference to a flowchart in FIG. 10. For example, this process is started by an operator operating a menu of a window screen displayed on the display 114 using the keyboard 110 or the mouse 112.

Figure 15:
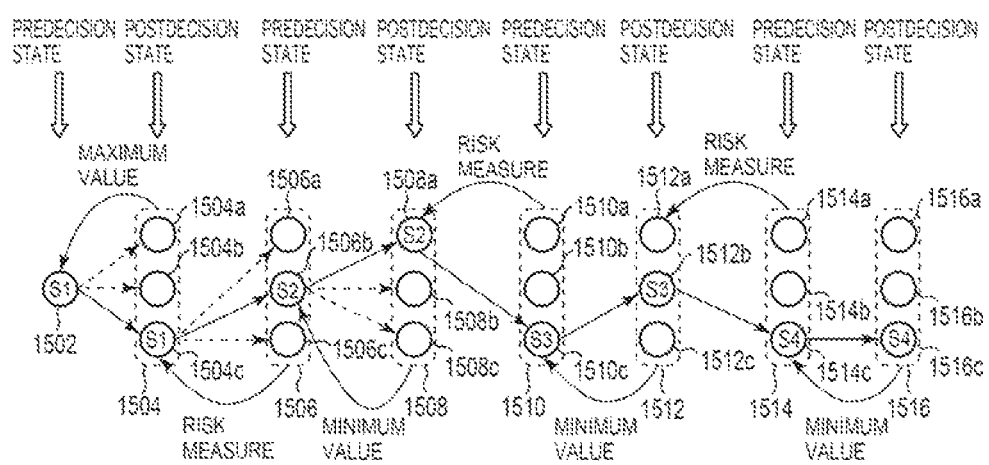
FIG. 15 is a diagram schematically showing the process of deciding an action that minimizes an iterated risk measure.

In this embodiment, it is assumed that a series of data objects for storing states are already loaded into the main memory 106 prior to the process described below. The data objects are, for example, instances of a class in JAVA® or C++. FIG. 15 schematically shows such data objects. A series of data objects 1502, 1504, 1506, 1508, 1510, 1512, 1514, and 1516 is shown in FIG. 15. In this embodiment, two states that are a predecision state and a postdecision state are used. In FIG. 15, the data objects 1502, 1506, 1510, and 1514 correspond to predecision states, and the data objects 1504, 1508, 1512, and 1516 correspond to postdecision states.

In step 1002, the main routine 902 sets an initial value of a variable s indicating a state, from the held parameter 904. The variable s is set to an attribute value of the data object 1502 which is the first data object in FIG. 15 and corresponds to a predecision state. For example, the state is represented by a combination of (money in possession, stock in which the user invests, time).

In step 1004, the main routine 902 pushes the state s onto a stack. Such pushing the state s onto the stack is performed for later popping and backtracking of the state.

In step 1006, the main routine 902 calls the EXPLORATION_POLICY routine 908 by EXPLORATION_POLICY(s) using s as an argument.

Figures 11, 12:
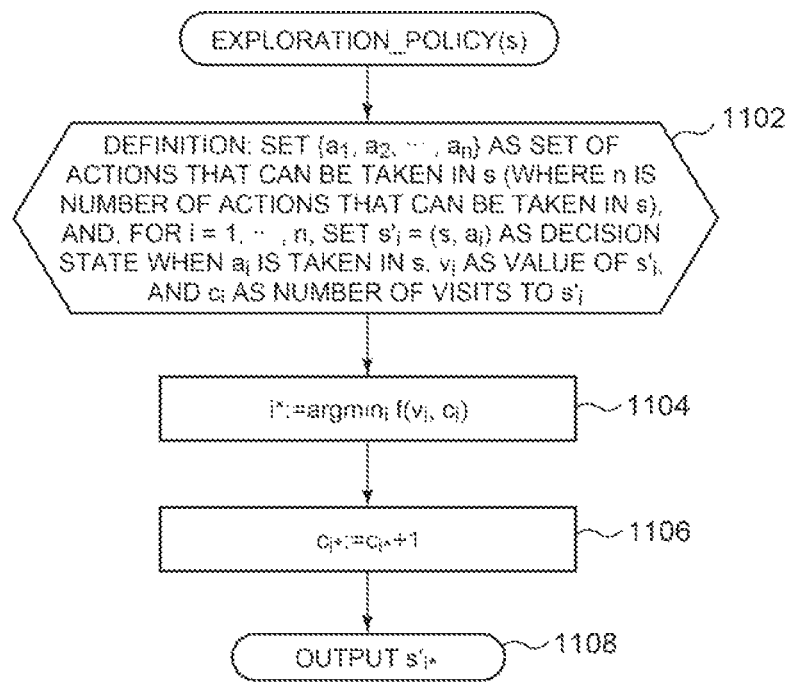
FIG. 11 is a flowchart of a process of an EXPLORATION_POLICY routine in the process of deciding an action that minimizes an iterated risk measure.
FIG. 12 is a diagram showing correspondence between postdecision states, values, and counters referenced to in the EXPLORATION_POLICY routine.

FIG. 11 shows a detailed process of the EXPLORATION_POLICY routine 908. As shown in definition step 1102, the EXPLORATION_POLICY routine 908 sets $\{a_1, a_2, \ldots, a_n\}$ as a set of actions that can be taken in the state s. The EXPLORATION_POLICY routine 908 also sets, for i=1, ..., n, $s'_i=(s, a_i)$ as a postdecision state when $a_i$ is taken in s, $v_i$ as a value of $s'_i$, and $c_i$ as the number of visits to $s'_i$. The value mentioned here is the same as that described with reference to FIG. 7. The number of visits to $s'_i$ is denoted by $c_i$. The number of visits $c_i$ is recorded in order to select a balanced action sequence by avoiding a postdecision state with a large number of visits as much as possible. FIG. 12 shows an example of correspondence between postdecision states, values, and counters.

In step 1104, the EXPLORATION_POLICY routine 908 computes i that minimizes a function $f(v_i, c_i)$.

For example, the function f is an expression such as $f(v, c) \equiv v + \alpha(\beta/c)^{0.6}$ though the present invention is not limited to such. That is, the function f has a requirement of monotonically increasing with v and monotonically decreasing with c. $\alpha$ and $\beta$ are positive constants, and parameters that can be arbitrarily set.

The EXPLORATION_POLICY routine 908 sets the computed i as i* in step 1104. The EXPLORATION_POLICY routine 908 increments $c_{i*}$ as $c_{i*}=c_{i*}+1$ in step 1106, and outputs $s_{i*}$ in step 1108.

The output of $s_{i*}$ can be understood more easily with reference to FIG. 15. Though postdecision states 1504a, 1504b, and 1504c can be reached from the predecision state 1502 by possible different actions, the postdecision state 1504c is selected according to the computation in step 1104.

Returning to step 1006 in FIG. 10, after the EXPLORATION_POLICY routine 908 is completed and s' is output in step 1006, the main routine 902 pushes s' onto the stack in step 1008.

Next, in step 1010, the main routine 902 calls the SAMPLE_POLICY routine 906 by SAMPLE_POLICY(s') using s' as an argument.

The SAMPLE_POLICY routine 906 performs a process of selecting one transitionable state based on the combination of a Monte Carlo method and a Markov decision process, in the same manner as the SAMPLE_POLICY routine 206. Since this process is the same as that shown in the flowchart in FIG. 4, its description is omitted here. This state selection corresponds to selecting a state 1506b in the predecision state 1506 from the state (S1) 1504c in the postdecision state 1504 in FIG. 15.

After the SAMPLE_POLICY routine 906 selects s from s' in step 1010, the main routine 902 pushes s onto the stack in step 1012.

Next, in step 1014, the main routine 902 determines whether or not to stop forward sampling. A criterion for stopping forward sampling is, for example, whether or not states are generated for a predetermined number of stages. Alternatively, the criterion for stopping forward sampling can be whether or not a predetermined time elapses from the start of the process.

In the case where the main routine 902 determines that the criterion for stopping forward sampling is not met, the main routine 902 returns to step 1006 to call the EXPLORATION_POLICY routine 908.

On the other hand, in the case where the main routine 902 determines that the criterion for stopping forward sampling is met in step 1014, the main routine 902 goes to step 1016, and pops the state s from the stack.

Next, the main routine 902 calls the UPDATE_VALUE_MIN routine 912 by UPDATE_VALUE_MIN(s) using the popped state s. The following describes a process of the UPDATE_VALUE_MIN routine 912, with reference to a flowchart in FIG. 13.

Figures 13, 14:
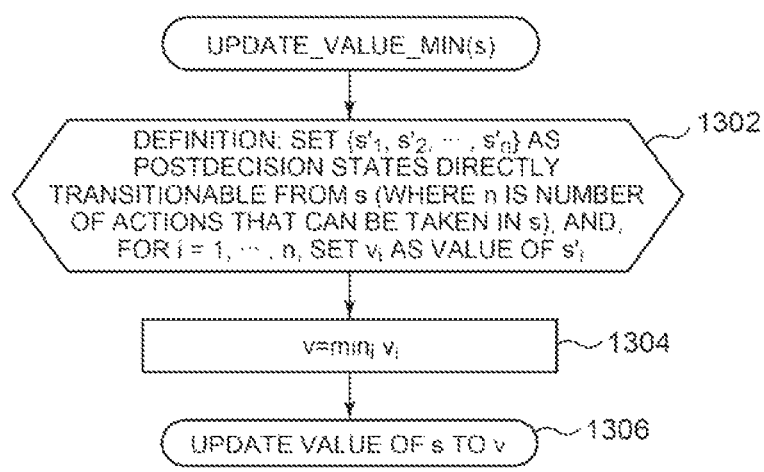
FIG. 13 is a flowchart of a process of an UPDATE_VALUE_MIN routine in the process of deciding an action that minimizes an iterated risk measure.
FIG. 14 is a diagram showing correspondence between postdecision states and values referenced to in the UPDATE_VALUE_MIN routine.

In FIG. 13, step 1302 is a definition step. In step 1302, the UPDATE_VALUE_MIN routine 912 sets $\{s'_1, s'_2, \ldots, s'_n\}$ as a set of postdecision states directly reachable from s. The UPDATE_VALUE_MIN routine 912 also sets, for i=1, ..., n, $v_i$ as a value of $s'_i$. FIG. 14 shows correspondence between postdecision states and values.

In next step 1304, the UPDATE_VALUE_MIN routine 912 computes, for i=1, ..., n, a minimum value of $v_i$ as v, according to $v = \min_i v_i$. In step 1306, the UPDATE_VALUE_MIN routine 912 stores the computed v as a value of s. In the example in FIG. 15, supposing that the popped state s is a predecision state (S4) 1514c, actions 1516a, 1516b, and 1516c are actions that can be taken in the state 1514c. When the minimum value among the values associated with the actions 1516a, 1516b, and 1516c is the value associated with the action 1516c, this value is stored in the state 1514c.

Returning to the flowchart in FIG. 10, the main routine 902 determines whether or not the stack is empty in step 1020. In the case where the stack is empty, the main routine 902 determines whether or not a stopping condition is met in step 1026. The stopping condition mentioned here is any of whether or not a predetermined time elapses from the start of the process shown in the flowchart in FIG. 10, whether or not a loop of steps 1002 to 1014 is performed a predetermined number of times, or whether or not a value at the starting point designated by S1 in FIG. 15 eventually has only a change of a threshold or below from a value computed in the immediately preceding loop of steps 1002 to 1014.

In the case where the main routine 902 determines that the stopping condition is met, the process ends. Otherwise, the main routine 902 returns to step 1002, to resume the process from the first step. At this time, the values set in the states in the previous loop are maintained, and put to use in the next computation.

In the case where the main routine 902 determines that the stack is not empty in step 1020, the main routine 902 pops the state s' from the stack in step 1022. The main routine 902 then calls the UPDATE_VALUE routine 910 by UPDATE_VALUE(s') in step 1024, to update the value of s'. The process of the UPDATE_VALUE routine 910 is substantially the same as the process of the UPDATE_VALUE routine 208, which is shown in detail in the flowchart in FIG. 6. In the example in FIG. 15, a value of a postdecision state (S3) 1512b is computed from predecision states 1514a, 1514b, and 1514c.

After step 1024, the main routine 902 returns to step 1016. As a result, an action sequence of actions 1504c, 1508a, 1512b, and 1516c is obtained. The main routine 902 calls the output routine 914 to output, for each predecision state, an action a associated with a postdecision state (s, a) having a minimum value among postdecision states directly transitionable from the predecision state. The output result is preferably displayed on the display 114 or written to a file.

Though the above embodiment of the present invention is described using an example of applying to a process of selecting a stock in which the user is to invest in each term with predetermined money in possession, the present invention is not limited to this, and is applicable to any decision making process that involves probabilistic risk computation performed sequentially in time series.

The present invention is not limited to a specific hardware and software platform of a computer, and can be implemented with any platform.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as JAVA, SMALLTALK, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for computing an iterated risk measure, the method comprising the steps of:

generating sequentially, by way of a Markov decision process based on a Monte Carlo method, a series of data objects having states on a memory of a computer;

computing a risk measure of a data object by tracking generated data from opposite order to generation order, wherein said risk measure is calculated from a value at risk or an exceedance probability that is derived from risk measures of a plurality of states transitionable from a state of said data object, the computing the risk measure including: solving a mathematical equation, $$VaR_{\alpha\%}[X] = \inf_{x \in R} \left\{ \sum_{i: v_i > x} p_i \leq 1 - \frac{\alpha}{100} \right\}$$

wherein:
X is a random variable;
$v_i$ (i=1, ..., n) is a value of each of said plurality of states transitionable from said state of said data object and
$p_i$ (i=1, ..., n) is a transition probability of each of said plurality of states transitionable from said state of said data object; and
executing said step of computing said risk measure while tracking back to starting data,
wherein at least one of the steps is carried out using a computer device.

2. The method according to claim 1, wherein said step of computing a risk measure uses a following expression:

$$Pr(X > x) = \sum_{i: v_i > x} p_i$$

wherein:
Pr is a probability;
X is a random variable;
$v_i$ (i=1, ..., n) is a value of each of said plurality of states transitionable from said state of said data object; and
$p_i$ (i=1, ..., n) is a transition probability of each of said plurality of states transitionable from said state of said data object.

3. The method according to claim 1, further comprising:
randomly selecting a number m, the selected number m is larger than one but less than a number n;
calculating a probability $p_i$ that a number i is selected as the number m, the calculated probability $p_i$ representing a probability of transiting from said state of said data object to a state $s_i$;
outputting a state $s_m$ that corresponds to the randomly selected number m; and
making a state transition from said state of said data object to said state $s_m$.

4. The method according to claim 1, wherein said computing said risk measure further comprises:
setting a set of states, $\{s_1, s_2, ..., s_n\}$, which are directly transitionable from said state of said data object, where n is a number of directly transitionable states from said state of said data object;
setting said $p_i$ as the transition probability from said state of said data object to a state $s_i$, where i is between 1 and the n;
setting said $v_i$ as said value of said state $s_i$;
computing said $VaR_{\alpha}\%[X]$ at a risk of said random variable X that takes said $v_i$ with said probability $p_i$; and
computing a risk measure v of said random variable X by using said $VaR_{\alpha}\%[X]$, wherein the risk measure v is computed by $v=E[X|X>VaR_{\alpha}\%[X]]$.

5. A non-transitory computer readable storage medium tangibly embodying a computer readable program code having computer readable instructions which when implemented, cause a computer to carry out the steps of claim 1.

6. A method for computing an action that minimizes an iterated risk measure, the method comprising the steps of:
generating, during postdecision, data comprising combinations of a predetermined state and a possible action on a memory of the computer;
selecting a state-action combination data from generated data of said combinations of said state and said action, based on a value associated with each of said combinations;
generating, during predecision, a state from selected state-action combination data, by way of a Markov decision process based on a Monte Carlo method;
generating a state data sequence by iterating said step of generating a state and said step of generating data comprising combinations;
computing, based on risk measures of a plurality of states transitionable from a present predecision state, a risk measure of an immediately preceding postdecision state by tracking generated states in opposite order to order of the generation, wherein said risk measure is calculated from a value at risk or an exceedance probability, the computing the risk measure including: solving a mathematical equation, $$VaR_{\alpha\%}[X] = \inf_{x \in R}\left\{\sum_{i: v_i > x} p_i \leq 1 - \frac{\alpha}{100}\right\}$$

wherein:

X is a random variable;

$v_i$ (i=1, . . . , n) is a value of each of said plurality of states transitionable from said state of said data object and $p_i$ (i=1, . . . , n) is a transition probability of each of said plurality of states transitionable from said state of said data object; and setting a value of a state having a minimum value in a present postdecision state to an immediately preceding predecision state, by tracking said generated states in the opposite order to the order of the generation, wherein at least one of the steps is carried out using a computer device.

7. The method according to claim 6, wherein the step of computing a risk measure uses the following expression:

$$Pr(X > x) = \sum_{i: v_i > x} p_i$$

wherein:

Pr is a probability;

X is a random variable;

$v_i$ (i=1, . . . , n) is a value of each of said plurality of states transitionable from said state of said data object; and $p_i$ (i=1, . . . , n) is a transition probability of each of said plurality of states transitionable from said state of said data object.

8. The method according to claim 6, wherein said step of selecting a state-action combination data uses a function which is a monotonically decreasing function with respect to a frequency of visiting said state.

9. A non-transitory computer readable storage medium tangibly embodying a computer readable program code having computer readable instructions which when implemented, cause a computer to carry out the steps of claim 6.

10. A system for computing an iterated risk measure, the system comprising:

a memory device;

a processor connected to said memory device, wherein said processor is configured to perform:

generating sequentially, by way of a Markov decision process based on a Monte Carlo method, a series of data having states on a memory of a computer;

computing a risk measure of a present object by tracking generated data from opposite order to generation order, wherein said risk measure is calculated from a value at risk or an exceedance probability that is derived from risk measures of a plurality of states transitionable from a state of said present object, the computing the risk measure including: solving a mathematical equation, $$VaR_{\alpha\%}[X] = \inf_{x \in R}\left\{\sum_{i: v_i > x} p_i \leq 1 - \frac{\alpha}{100}\right\}$$

wherein:

X is a random variable;

$v_i$ (i=1, . . . , n) is a value of each of said plurality of states transitionable from said state of said data object and $p_i$ (i=1, . . . , n) is a transition probability of each of said plurality of states transitionable from said state of said data object; and executing said risk measure module while tracking back to starting object.

11. The system according to claim 10, wherein the processor is further configured to compute said risk measure using the following expression:

$$Pr(X > x) = \sum_{i: v_i > x} p_i$$

wherein:

Pr is a probability;

X is a random variable;

$v_i$ (i=1, . . . , n) is a value of each of said plurality of states transitionable from said state of said data object; and $p_i$ (i=1, . . . , n) is a transition probability of each of said plurality of states transitionable from said state of said data object.

12. A system for computing an action that minimizes an iterated risk measure, the system comprising:

a memory device;

a processor connected to said memory device, wherein said processor is configured to perform:

generating, during postdecision, data comprising combinations of a predetermined state and a possible action on a memory of the computer;

selecting a state-action combination data from generated data of said combinations of said state and said action, based on a value associated with each of said combinations;

generating, during predecision, a state from selected state-action combination data, by way of a Markov decision process based on a Monte Carlo method;

generating a state data sequence by iterating said step of generating a state and said step of generating data comprising combinations;

computing, based on risk measures of a plurality of states transitionable from a present predecision state, a risk measure of an immediately preceding postdecision state by tracking generated states in opposite order to order of the generation, wherein said risk measure is calculated from a value at risk or an exceedance probability, the computing the risk measure including: solving a mathematical equation, $$VaR_{\alpha\%}[X] = \inf_{x \in R}\left\{\sum_{i: v_i > x} p_i \leq 1 - \frac{\alpha}{100}\right\}$$

wherein:

X is a random variable;

$v_i$ (i=1, . . . , n) is a value of each of said plurality of states transitionable from said state of said data object and $p_i$ (i=1, . . . , n) is a transition probability of each of said plurality of states transitionable from said state of said data object; and setting a value of a state having a minimum value in a present postdecision state to an immediately preceding predecision state, by tracking said generated states in the opposite order to the order of the generation.

13. The system according to claim 12, wherein the processor is further configured to compute said risk measure using the following expression:

$$Pr(X > x) = \sum_{i: v_i > x} p_i$$

wherein:
Pr is a probability;
X is a random variable;
$v_i$ (i=1, ..., n) is a value of each of said plurality of states transitionable from said state of said data object; and
$p_i$ (i=1, ..., n) is a transition probability of each of said plurality of states transitionable from said state of said data object.

14. The system according to claim 12, wherein the processor is further configured to use a function which is a monotonically decreasing function with respect to a frequency of visiting said state.

\* \* \* \* \*